Patented Oct. 14, 1941

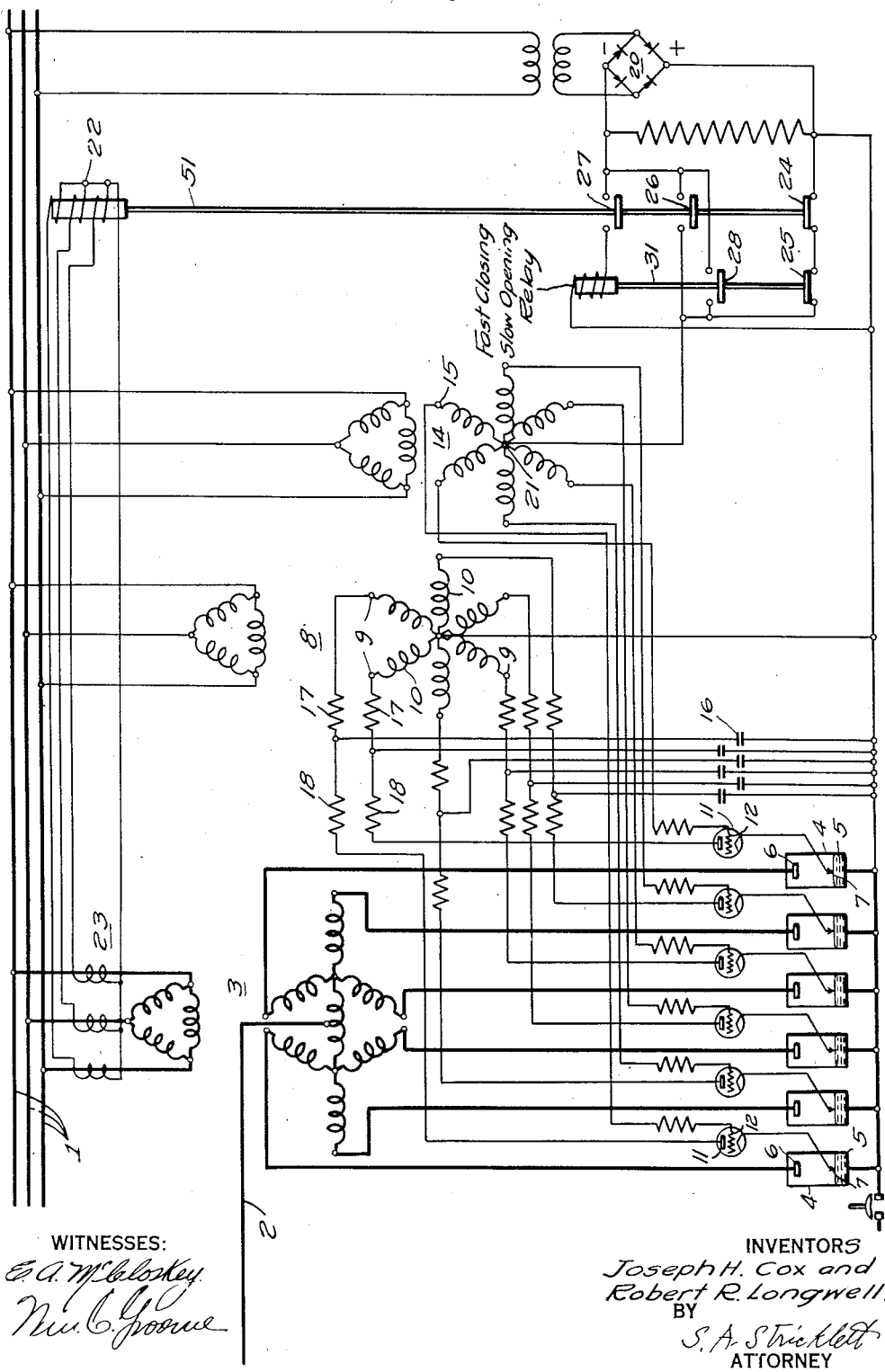

2,259,295

UNITED STATES PATENT OFFICE 2,259,295

PROTECTIVE SYSTEM FOR VAPOR ELECTRIC DEVICES

Joseph H. Cox and Robert R. Longwell, Forest Hills, Pa., assignors to Westinghouse Electric & Manufacturing Company, East Pittsburgh, Pa., a corporation of Pennsylvania Application August 2, 1940, Serial No. 349,659

1 Claim. (Cl. 175—354)

Our invention relates to vapor electric converters, and particularly to a control system for controlling the operation of a make-alive type converter.

In the operation of vapor electric devices having a plurality of make-alive type valves, it is found that these valves are occasionally subject to arc-back or other current faults. Heretofore, it has been necessary to open the supply circuit to the converter in order to interrupt the fault and secure the return to normal operation or control of the valves.

It is frequently desirable to clear the fault without opening the supply circuit to the valves in order to maintain service with a minimum of outage. We have discovered that this may be accomplished by momentarily interrupting the controlling impulses to the make-alive electrodes of the valves comprising the converter.

The control system, according to our invention comprises an impulsing system for applying periodic impulses in succession to the various valves of the converter. In order to interrupt the controlling impulses we have provided a source of biasing potential for the grids of the firing tubes and provided a fault-responsive relay for applying biasing potential in the event of fault in the valves of the converter.

It is accordingly an object of our invention to provide a control system which will eliminate a fault in the valves of a converter without the necessity of disconnecting the converter from the supply circuit.

It is a further object of our invention to provide a control system for blocking the operation of the valves of a vapor electric device for a sufficient interval to clear the effect of a fault therein.

It is a further object of our invention to provide a fault responsive relay for interrupting the controlling impulses in a vapor electric device.

Other objects and advantages of our invention will be apparent from the following detailed description taken in conjunction with the accompanying drawing in which the single figure is a schematic illustration of a vapor electric converter embodying our invention.

In the exemplary embodiment of our invention, according to the illustration of our invention, an alternating current circuit 1 is connected to a direct current circuit 2 by means of a suitable connecting transformer 3. Make-alive type valves 4 are connected to the secondary terminals of the connecting transformer 3 for controlling the flow of power between the circuits 2 and 1. Each of the valves 4 comprise a vaporizable reconstructing cathode 5 of any suitable material, such as mercury. Cooperating with the cathode is an anode 6 for maintaining the main arc discharge in the valve 4. A suitable controlling electrode, such as a make-alive electrode, is maintained in permanent contact with the vaporizable cathode 5.

Suitable controlling impulses are supplied to the make-alive electrode 7 by an impulsing system, including a control transformer 8 which is supplied with alternating current of suitable phase relation, from any convenient source, such as the alternating current circuit 1. The phase terminals 9 of the secondary phase winding 10 of the control transformer 8 are connected to the make-alive electrodes 7 by means of suitable unilaterally conducting devices, usually firing tubes 11.

Individual firing tubes 11 are supplied with control grids 12 which, in turn, are controlled by a suitable firing transformer 14, the phase terminals 15 of which are connected to the control grids 12 of the firing tubes 11.

In order to secure the desired wave form of make-alive impulses, and to conserve control energy, suitable energy storing devices such as capacitors 16 are usually connected in parallel with the phase windings 10 of the controlling transformer 8. Suitable impedances 17 are usually connected between the phase terminals 9 of the control transformer 8 and the energy storing devices 16 in order to control the charging rate of the capacitors 16. Also, suitable impedances 18 usually of less ohmic value than the charging impedance 17 are connected between the energy storing devices 16 and the make-alive electrodes 7 to control the wave-shape of the potential applied to the make-alive electrodes 7.

A suitable source 20 of direct current biasing potential is provided for connection between the cathodes 5 of the valves 4 and a mid-tap 21 in the phase windings of the firing transformer 14.

A suitable fault-responsive relay 51 is provided for connecting the biasing potential of the source 20 in series with the firing transformer 14 in the event of fault in the converter. The actuating coils 22 of the fault-responsive relay 51 are preferably connected to a suitable current transformer 23 associated with the alternating current supply leads of the converter transformer 3. The fault-responsive relay 51 is preferably of the high-speed type and in order to maintain the application of the biasing potential for a sufficient interval to insure interruption of the fault, an auxiliary relay 31 of the fast-closing, time-delay-opening type is energized by the closing of the fault-responsive relay 51.

In the operation of the control system, according to our invention, the back-contacts 24 and 25 of the fault-responsive relay 51 and the time-delay relay 31 connect the phase windings of the firing transformer 14 to the cathodes 5 of the valves 4, thus rendering ineffective the biasing potential 20. In the event of fault, the fault-responsive relay 51 picks up opening its back contact 24 and closing its front contact 26 to apply the biasing potential 20 to the firing transformer 14, at the same time the auxiliary front contact 27 on the relay 51 energizes the timing relay 31 which picks up its back contact 25 in series with contact 24 opening the cathode to firing the transformer circuit, closing its front contact 21 in parallel with contact 26 which connects the negative bias 20 to the firing transformer 14. The fault responsive relay 51 then drops out deenergizing the timing relay 31 which, because of its construction, remains closed for a predetermined interval to maintain the blocking potential 20 on the firing transformer 14 until the fault has been extinguished in the vapor electric converter.

While for purposes of illustration there is shown and described the specific embodiment of our invention, it will be apparent that changes and modifications can be made therein without departing from the true spirit of our invention and the scope of the appended claim.

We claim as our invention:

An electric current conversion system comprising an alternating current circuit, a direct current circuit, means including a plurality of make-alive type valves for controlling the flow of energy between said circuits, a make-alive electrode in each of said valves, a control transformer for supplying make-alive energy to said make-alive electrodes, firing tubes in series with each of said make-alive electrodes, a control grid in each of said firing tubes, a firing transformer for supplying energy to said control grids, a source of biasing potential for connection to said firing transformer, a high speed fault responsive relay associated with said converter means controlled by said relay for connecting said biasing potential to said firing transformer, and an auxiliary relay of the fast closing slow opening type energized by said first mentioned fault responsive relay for maintaining said biasing potential for a predetermined time interval.

JOSEPH H. COX.
ROBERT R. LONGWELL.